United States Patent [19]

Bogert

[11] Patent Number: 5,063,817
[45] Date of Patent: Nov. 12, 1991

[54] LOCKOUT SYSTEM FOR AUTOMATIC TRANSMISSION

[76] Inventor: Donald L. Bogert, 3608 W. Campbell Ave., Phoenix, Ariz. 85019

[21] Appl. No.: 485,597

[22] Filed: Feb. 27, 1990

[51] Int. Cl.⁵ .............................................. F16H 57/06
[52] U.S. Cl. ........................................ 74/878; 74/876; 74/476
[58] Field of Search ................. 74/876, 878, 476, 477, 74/473, 483 R

[56] References Cited

U.S. PATENT DOCUMENTS

| | | | |
|---|---|---|---|
| 2,916,937 | 12/1959 | Iavelli | 74/472 |
| 3,602,061 | 8/1971 | Nemiroff | 74/476 |
| 4,255,984 | 3/1981 | Abels et al. | 74/474 |
| 4,524,635 | 6/1985 | Hulin et al. | 74/476 |
| 4,534,237 | 8/1985 | Carosino | 74/476 |
| 4,945,482 | 7/1990 | Nishikawa et al. | 74/878 |

FOREIGN PATENT DOCUMENTS

| | | | |
|---|---|---|---|
| 57-90446 | 6/1982 | Japan | 74/476 |
| 2173555 | 10/1986 | United Kingdom | 74/476 |

*Primary Examiner*—Allan D. Herrmann
*Assistant Examiner*—William O. Trousdell
*Attorney, Agent, or Firm*—Don J. Flickinger; Jordan M. Meschkow

[57] ABSTRACT

A system for preventing damage to automatic transmissions due to improper shifting is disclosed. The system includes a blocking member and an actuator which externally mount to a transmission. The blocking member mounts to a shifter shaft of the transmission and rotates with the shifter shaft as gears are being selected. The blocking member includes a cam portion which has at least one hole therein. The actuator mounts at a stationary position on the transmission in which a plunger portion of the actuator is near the cam of the blocking member. The plunger is spring-biased to extend toward the cam unless the actuator is actuated. The hole in the cam is aligned with the plunger when the transmission is in neutral. Accordingly, unless the actuator is actuated, the plunger is forced into the cam hole when an attempt is made to shift between forward and reverse gears. A controller is configured to actuate the actuator when the speed of an engine is around an idle speed and when a movement sensor indicates that a vehicle is or should be stopped. When the actuator is actuated, the plunger is retracted from the cam hole, and the transmission may be shifted to any forward or reverse gear.

7 Claims, 2 Drawing Sheets

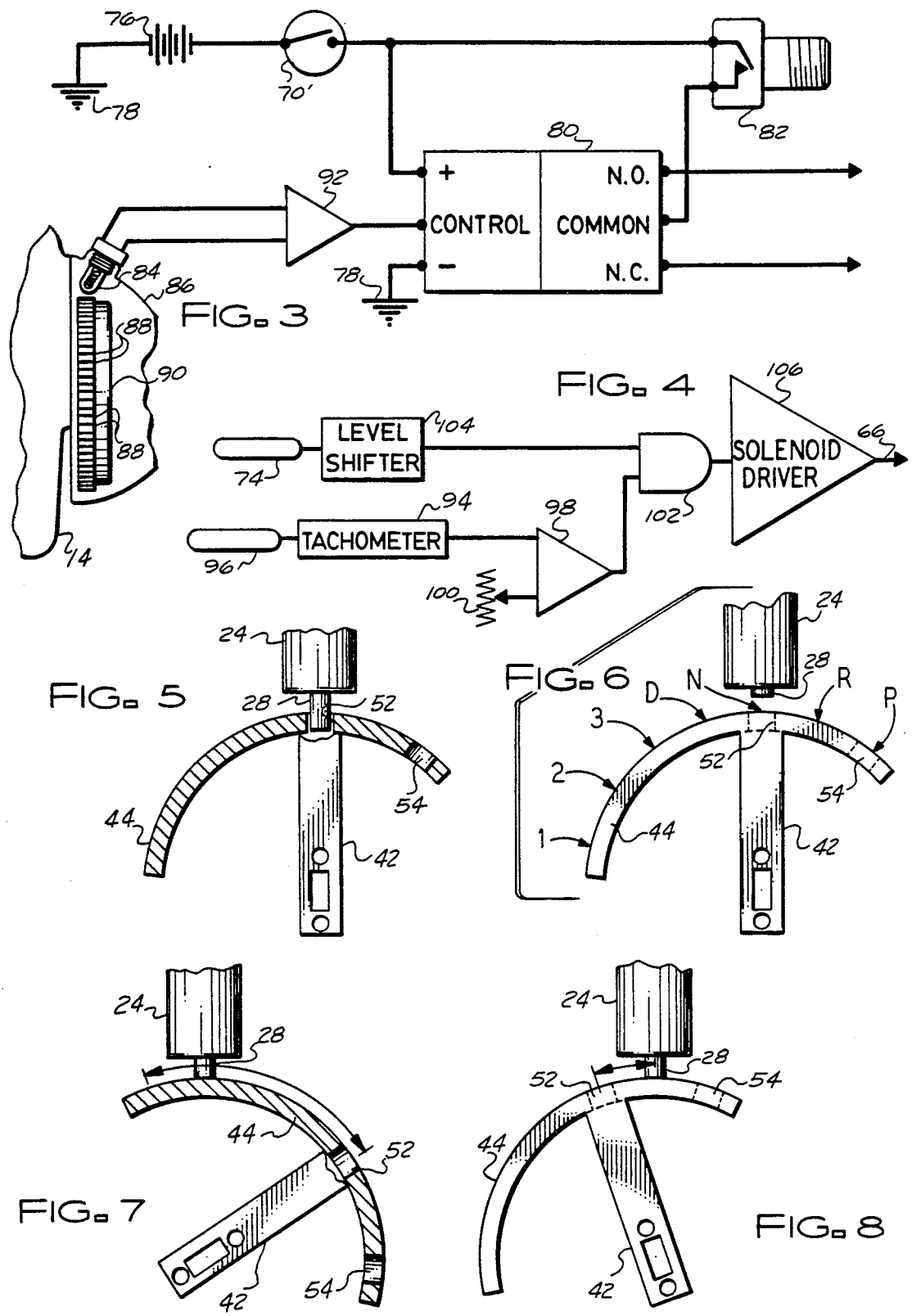

LOCKOUT SYSTEM FOR AUTOMATIC TRANSMISSION

TECHNICAL FIELD OF THE INVENTION

The present invention relates generally to devices which protect automatic transmissions from potential damage caused by improper gear changing. More specifically, the present invention relates to a lockout mechanism which prevents a transmission from shifting between forward and reverse gears, and vice-versa, until specified conditions are met.

BACKGROUND OF THE INVENTION

Automatic transmissions of vehicles, such as conventional cars, trucks, heavy equipment, and the like, may be damaged by improper gear changing. Such damage may be severe, in which case the damage is a complete transmission failure caused by a large transmission overstress. On the other hand, transmission damage may be latent, in which case it shows up later as reduced reliability resulting from a series of milder stresses, which are nevertheless greater than the transmission was designed to handle.

The overstresses typically result from a large mismatch between vehicle inertia and engine speed. For example, in one typical improper gear-changing scenario a vehicle's direction is changed by shifting the transmission between forward and reverse gears without first coming to a stop. This scenario requests the transmission to instantly institute an enormous vehicle inertia change. In another typical improper gear-changing scenario, a vehicle's transmission is slammed into gear from a neutral position while an engine operates at a relatively high speed, colloquially referred to as revved up. Again, this scenario requests the transmission to instantly institute an enormous vehicle inertia change so that vehicle speed will thereafter match engine speed.

All vehicles with automatic transmissions potentially face the problem of transmission damage caused by improper gear changing. However, in some vehicles this problem is extremely serious. For example, heavy vehicles, such as trucks and other heavy equipment, are more likely to experience transmission damage due to improper gear changes than other vehicles. The great weight of these vehicles and of the loads which they may carry, when coupled with the great power of the engines which are typically used to propel these vehicles, leads to great potential disparities between vehicle inertia and engine speed. In addition, both heavy and light vehicles suffer increased incidences of transmission damage when they are maintained as part of a fleet, such as a rental or company fleet. Such fleet vehicles are typically driven by persons who are not financially responsible for damage they cause by improperly changing gears. As a result, they tend to be less careful in operating the vehicle's transmissions. Accordingly, those organizations responsible for maintaining a fleet of vehicles, and others having vehicles with automatic transmissions, feel a need for a mechanism or system which prevents such damage.

Prior art devices which address this problem are known. However, the conventional systems are typically configured for incorporation in an overall vehicle design. Hence, they are typically unsuitable for retrofit within existing vehicles. Specifically, such conventional devices are undesirably complicated and expensive when adapted to a retrofit application. While the excessive complication and expense relate both to system components and to component installation, the installation of components is an exceptionally acute problem for fleet operators and others who wish to retrofit existing vehicles. For example, such conventional systems typically require installation of components at difficult-to-access locations within a vehicle, such as under a dashboard or within a transmission. Thus, installation costs are undesirably high.

SUMMARY OF THE INVENTION

Accordingly, it is an advantage of the present invention that an improved system for preventing transmission damage is provided.

Another advantage of the present invention is that the present invention is configured for retrofit into existing vehicles.

Yet another advantage is that the present invention uses an actuator and a blocking member which attach to an exterior portion of an existing transmission to prevent improper gear shifting.

The above and other advantages of the present invention are carried out in one form by an improved transmission locking apparatus which is used in connection with a vehicle's transmission. As is conventional with vehicle transmissions, the transmission with which the present invention is used has a housing and a rotatable shifter shaft extending through the housing. The shifter shaft may be used to select a forward gear when rotated in a first direction from a neutral position and a reverse gear when rotated in a second direction from the neutral position. The apparatus includes a blocking member which may be attached to the shifter shaft so that it rotates when the shifter shaft rotates. The blocking member has a hole in it. In addition, the apparatus includes an actuator which may be mounted to the transmission housing. The actuator has a plunger which is mutually configured with the blocking member so that when the actuator and the blocking member are mounted to the housing and shifter shaft, respectively, the plunger extends toward the blocking member. Moreover, the plunger and the blocking member are mutually configured so that when the shifter shaft is in its neutral position, the plunger extends through the blocking member hole to prevent rotation of the shifter shaft in either of the first or second directions.

The above and other advantages of the present invention are carried out in another form by an improved method of protecting a transmission from damage caused by improper gear changing. The method includes the step of attaching a cam to a shifter shaft of the transmission so that the cam rotates as the shifter shaft rotates. The cam includes a hole that also rotates as the shifter shaft rotates. The method positions an actuator having a spring-biased plunger near the cam so that the actuator's plunger rides against the cam as the shifter shaft rotates. In addition, a hole is located in the cam so that it is in alignment with the plunger when the transmission is in its neutral gear. The method inserts the plunger into the hole when said shifter shaft selects the transmission's neutral gear.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

FIG. 3 shows a schematic diagram of a first embodiment of a controller portion of the present invention;

FIG. 4 shows a schematic diagram of a second embodiment of the controller portion of the present invention;

FIG. 5 shows the operation of the present invention with a vehicle's transmission in a neutral gear and an actuator portion of the present invention in a non-actuated state;

FIG. 6 shows the operation of the present invention with the vehicle's transmission in a neutral gear and the actuator portion of the present invention in an actuated state;

FIG. 7 shows the operation of the present invention with the vehicles transmission in a forward gear; and FIG. 8 shows the operation of the present invention with the vehicle's transmission in a reverse gear.

DETAILED DESCRIPTION OF THE PREFERRED EMBODIMENTS

Figure 1:
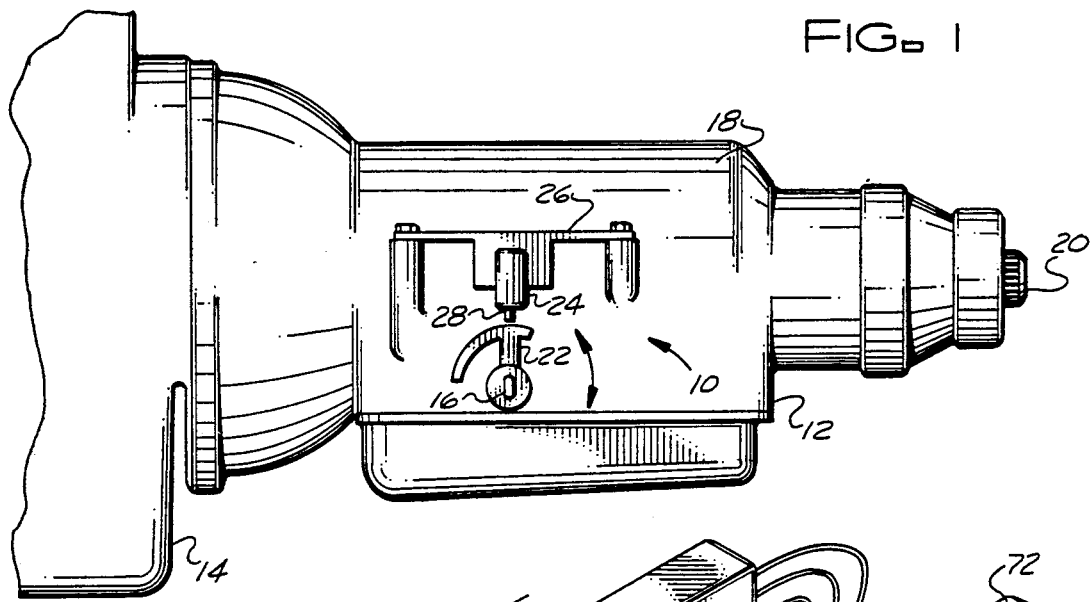
FIG. 1 shows the present invention mounted on a vehicle's transmission.

As shown in FIG. 1, a transmission lockout mechanism 10 constructed in accordance with the teaching of the present invention mounts to an exterior of a conventional automatic transmission 12 of a vehicle (not shown). Transmission 12 may reside in any of a wide variety of conventional vehicles, such as cars, trucks, farm equipment, construction equipment, mining equipment, and the like. As is conventional, transmission 12 is driven by an engine 14. Transmission 12 includes a shifter shaft 16 which extends through a transmission housing 18. As is conventional, shifter shaft 16 rotates back and forth within an arc to specify various gears, which transmission 12 uses in transmitting rotational power from engine 14 to an output shaft 20 of transmission 12. In conventional transmissions a park position resides at one extreme of the arc of rotation; and, proceeding to the other extreme, a reverse gear or gears are positioned next to the park position, followed by a neutral position, and then various forward gears, as indicated in FIG. 6.

Mechanism 10 includes a blocking member 22, which positively attaches to shifter shaft 16 so that member 22 rotates with and to the same degree as shifter shaft 16. In other words, blocking member 22 rotates back and forth within an arc as shifter shaft 16 rotates to select gears. An actuator 24 attaches to transmission housing 18 through a suitable bracket 26 so that it resides near blocking member 22. Actuator 24 remains stationary as blocking member 22 rotates. In addition, actuator 24 includes a plunger 28 which extends outward from actuator 24 toward blocking member 22.

Figure 2:
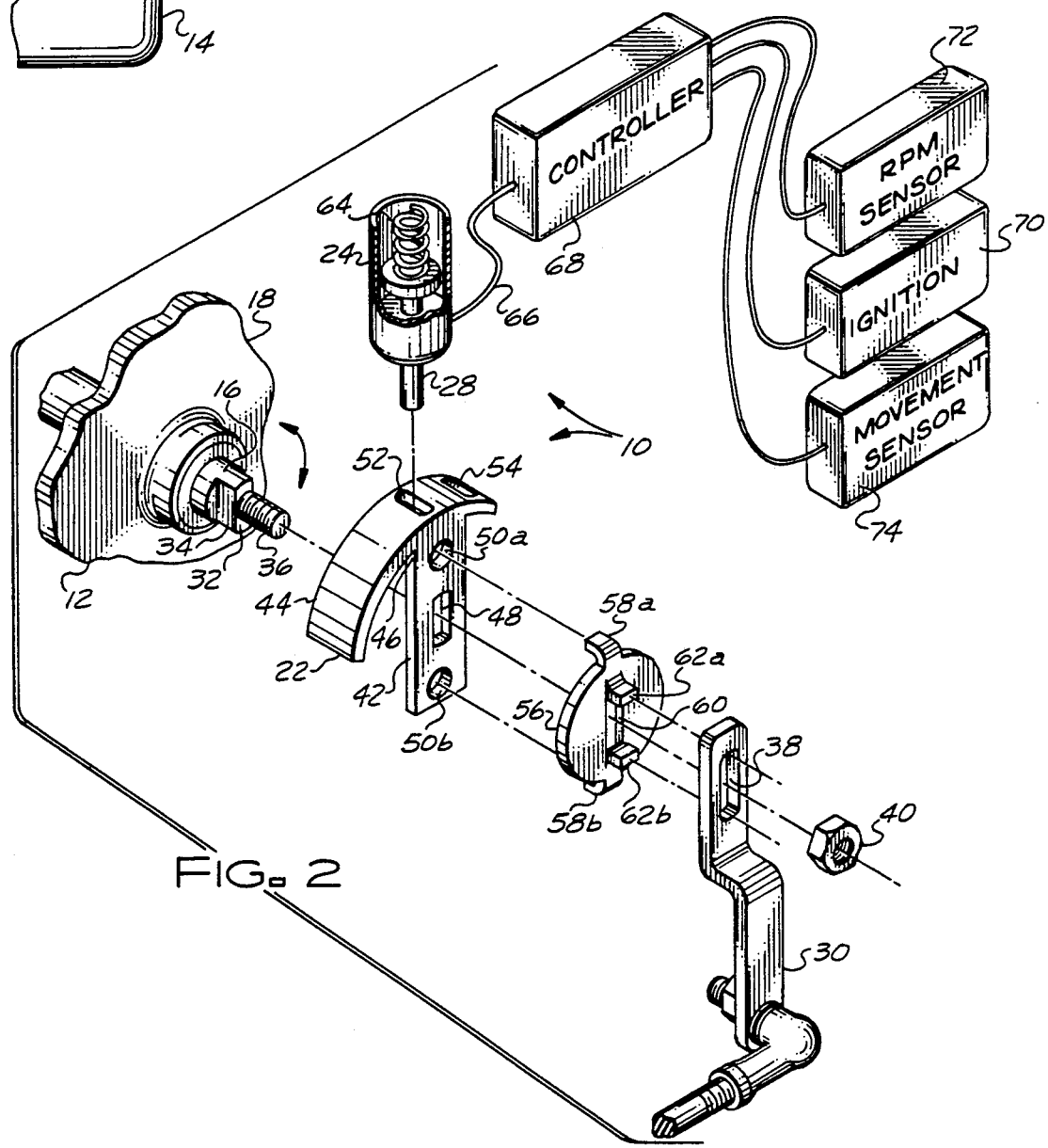
FIG. 2 shows an exploded view of the present invention.

FIG. 2 shows an exploded view of mechanism 10 in relationship to transmission 12 and a shift linkage 30. Shift linkage 30 represents the part of the vehicle which a driver controls to rotate shifter shaft 16 to select a desired transmission gear. As is conventional, an end 32 of shifter shaft 16, which extends out from transmission housing 18, is formed to exhibit a relatively large diameter circular cross-section immediately adjacent to housing 18. Proceeding outward, end 32 forms a medial diametrically elongated protrusion 34 and a distal threaded stud 36. The elongated portion of protrusion 34 extends the length of the large diameter, discussed above. Stud 36 exhibits a diameter substantially less than this large diameter, and about the same as the shorter dimension of elongated protrusion 34. Shift linkage 30 includes a member having a notch 38 dimensioned to mate with protrusion 34 and a nut 40 configured to threadably mate with stud 36. Conventionally, protrusion 34 mates directly with notch 38 so that linkage 38 may selectably rotate shifter shaft 16.

However, in accordance with the present invention, protrusion 34 mates directly with blocking member 22 rather than with shift linkage 30. Specifically, blocking member 22 includes a radially extending plate 42 attached to an axially extending plate or cam 44. Plate 42 extends radially, or in the plane of rotation, relative to shifter shaft 16, and plate 44 extends axially toward transmission 12 from a distal edge 46 of plate 42, relative to shifter shaft 16. Radially extending plate 42 includes a notch 48 dimensioned substantially the same as notch 38, discussed above. Thus, notch 48 mates directly with protrusion 34. In addition, plate 42 includes first and second holes 50a and 50b, respectively, which reside on opposing sides of notch 48. Axially extending plate 44 includes a neutral hole 52 and an optional park hole 54. Moreover, axial plate 44 is curved so that it follows an arc. In other words, all points on a surface of plate 44 are generally equivalent distances from the center of notch 48.

An extension adapter plate 56 couples shift linkage 30 to radially extending plate 42. Specifically, adapter plate 56 is a generally circular plate having a diameter approximately equal to the distance between first and second holes 50a and 50b. Outside fingers 58a and 58b both extend generally perpendicularly away from the outside boundary of plate 56 in a first direction. Fingers 58a–58b are dimensioned and positioned to snugly mate with holes 50a and 50b, respectively, in radially extending plate 42. Plate 56 additionally includes a notch 60, which resides centrally therein. Notch 60 aligns with notch 48 when adapter plate fingers 58a–58b mate with holes 50a–50b. In addition, notch 60 is dimensioned so that protrusion 34 may fit within it. Inside fingers 62a and 62b extend generally perpendicularly away from plate 56 at opposing sides of notch 60 in a second direction, which opposes the first direction discussed above.

Moreover, fingers 62a–62b are positioned and dimensioned to outline an elongated area which has dimensions substantially equivalent to those of protrusion 34. Accordingly, fingers 62a–62b mate with notch 38 in shift linkage 30. Shift linkage 30, adapter plate 56, and radially extending plate 42 all attach to shifter shaft 16 by threadably mating nut 40 with stud 36.

As discussed above in connection with FIG. 1, actuator 24 mounts to housing 18 so that plunger 28 of actuator 24 extends toward blocking member 22. Specifically, actuator 24 includes a spring 64 or other resilient device which couples to plunger 28 so that plunger 28 is spring-biased or urged to move toward axially extending plate 44. Moreover, neutral and park holes 52 and 54, respectively, are positioned on axially extending plate 44 so that they align with plunger 28 when transmission 12 is in its neutral and park positions, respectively. Holes 52 and 54 are both dimensioned so that plunger 28 may be easily inserted therein and so that once plunger 28 is inserted therein, plate 44 is substantially prevented from rotating.

In the preferred embodiments of the present invention, actuator 24 is an electrical solenoid which is electrically controlled by a control line 66 from a controller 68. Controller 68 may be physically located at any convenient location within the vehicle. Controller 68 receives energization from an ignition module 70 when the vehicle is turned on. In addition, an engine speed or RPM sensor 72 couples to engine 14 (see FIG. 1) so that it generates a signal responsive to the speed of engine 14. Sensor 72 supplies this engine speed signal to controller 68. Furthermore, a movement sensor 74 couples to the vehicle so that it sends a signal to controller 68 to indicate whether or not the vehicle is moving.

FIG. 3 shows a schematic view of a first embodiment of the features which control actuator 24. In particular, a negative terminal of the vehicle's battery 76 couples to a ground terminal 78. A positive terminal couples through a series connected ignition switch 70', which serves as ignition module 70, to a positive terminal of an electrically controlled switch or relay 80 and to a first port of a pneumatically controlled electrical switch 82. A negative terminal of switch 80 couples to ground 78. A magnetic pickup 84 is installed in a bell housing 86 so that it resides near teeth 88 of a flywheel 90 of engine 14. The outputs of pickup 84 couple to inputs of an amplifier 92, and an output of amplifier 92 couples to a control input of switch 80. A second port of switch 82 couples to a common terminal of switch 80, and a normally closed (N.C.) terminal of switch 80 serves as control line 66, discussed above. Switch 82 additionally couples pneumatically to the vehicle's air braking system. Pneumatic switch 82 is configured so that it closes its electrical switch when sufficient air pressure, typically between 15 and 40 psi, is applied to insure that the vehicle is stopped. Control line 66 may optionally couple to a green light (not shown) in addition to actuator 24, and a normally open (N.O.) terminal of switch 80 may optionally couple to a red light (not shown).

As is conventional with magnetic pickup devices, pickup 84 generates a magnetic field which is repeatedly interrupted by teeth 88 as engine 14 operates. Hence, the output signal from pickup 84 varies in response to the speed of engine 14. Amplifier 92 is configured so that the engine speed signal which results when engine 14 operates at an engine speed at least slightly greater than an idle is sufficient to activate switch 80. For the purposes of the present invention, an idle speed indicates the lower range of speeds at which an engine normally operates. For a given set of conditions, such as air conditioner off or on and choke applied or not applied, the engine generally operates at speeds greater than or equal to its idle speed.

Accordingly, if ignition is turned on electrical energization is supplied to switch 82. If sufficient air pressure is applied to indicate that the vehicle is stopped, then switch 82 supplies this energization to the common terminal of switch 80. So long as the engine is operating at an idle speed, switch 80 is not activated, and energization is supplied at control line 66 to cause actuator 24 (see FIGS. 1-2) to operate in an actuated state. The green light, discussed above, illuminates to indicate that it is safe to change gear directions or to shift out of neutral. On the other hand, if the vehicle is not stopped or if engine 14 is operating at a speed greater than an idle, then energization is not applied at control line 66, and actuator 24 is in a non-actuated state.

FIG. 4 schematically shows a second embodiment of features which control actuator 24 (see FIGS. 1-2). In particular, a conventional electronic tachometer circuit 94 has an input which couples to a distributor 96 of engine 14. An output of tachometer 94 couples to a first input of a comparator 98. A second input of comparator 98 couples to a variable voltage reference source 100, and an output of comparator 98 couples to a first input of a logic element 102, which is configured to implement an AND function. Movement sensor 74 couples to an input of a level shifter circuit 104, and an output of level shifter circuit 104 couples to a second input of logic element 102. An output of logic element 102 couples to an input of a solenoid driver circuit 106, and an output of driver circuit 106 serves as control line 66, discussed above.

The coupling of tachometer 94 to distributor 96 in this FIG. 4 embodiment is desirable because it represents an easier installation task than that associated with magnetic pickup 84 of FIG. 3. In this embodiment, voltage reference source 100 is adjusted so that comparator 98 activates whenever distributor 96 provides signals indicating that engine 14 (see FIGS. 1 and 3) is operating at a speed which is at least slightly greater than an idle.

In this embodiment, movement sensor 74 may be implemented using a pneumatic switch similar to switch 82 discussed above in connection with FIG. 3. Alternatively, movement sensor 74 may be implemented using various conventional optical or magnetic pickups conventionally located in proximity to the vehicle's drive shaft, differential, or wheels (not shown). Furthermore, a switch (not shown) may advantageously be mounted in the vehicle near the brake pedal so that it becomes activated only when the brakes are pressed relatively hard, thereby causing a brake pedal to travel a relatively great distance. Those skilled in the art will recognize that all such implementations of movement sensor 74 provide suitable indications of vehicle movement for the purposes of the present invention.

Level shifter 104 adapts the electrical signal received from movement sensor 74 into a suitable form for application to logic element 102, and driver 106 buffers and protects logic element 102 from actuator 24 (see FIGS. 1-2). Accordingly, control line 66 activates only when engine speed is around an idle and movement sensor 74 indicates that the vehicle is or should be stopped. When control line 66 activates, actuator 24 operates in its actuated state. Actuator 24 is in its non-actuated state whenever engine speed is above an idle speed or movement sensor 74 indicates that the vehicle is or may be in motion.

FIGS. 5-8 illustrate the operation of mechanism 10 in conjunction with the shifting of transmission 12 (see FIGS. 1-2). FIGS. 5, 7, and 8 show actuator 24 in its non-actuated state. As discussed above, plunger 28 of actuator 24 is biased to move toward axially extending plate or cam 44. Accordingly, when actuator 24 is in its non-actuated state, plunger 28 rides against cam 44 while transmission 12 (see FIGS. 1-2) is in forward gears, as shown in FIG. 7, and in reverse gears, as shown in FIG. 8.

However, as shown in FIG. 5, when transmission 12 is shifted to a neutral position while actuator 24 is in its non-actuated state, plunger 28 is forced into hole 52 by spring 64 (see FIG. 2). Plunger 28 also drops into hole 54 when transmission 12 is shifted to its park position. Once plunger 28 is in either of holes 52 or 54, further rotation of cam 44 is blocked by plunger 28, and transmission 12 is locked or prevented from being shifted into a forward or reverse gear until plunger 28 is removed from hole 52 or 54. When actuator 24 is in its activated state, as shown in FIG. 6, plunger 28 is retracted from hole 52 or 54, and transmission 12 may then be shifted into any forward or reverse gear.

In summary, the present invention provides an improved system for preventing transmission damage caused by improper gear shifting. The present invention prevents direct and immediate shifting between forward and reverse gears when the vehicle is moving or when the vehicle's engine is not at an idle. Even when the vehicle is stopped, the present invention prevents it from being slammed into gear with the engine revved up. Such improper gear shifting is prevented by the cooperation between plunger 28 of actuator 24 and holes 52 and 54 of blocking member 22. Only when the vehicle is stopped and its engine is idling may its transmission be shifted between forward and reverse gears or shifted from park. In addition, the present invention is configured for installation externally to a vehicle's transmission. This location is easily accessed compared to under-dashboard and within-transmission alternatives. Hence, the present invention is configured for retrofit into existing vehicles because installation costs are minimized, or alternately for use in an originally manufactured vehicle.

The present invention has been described above with reference to preferred embodiments. However, those skilled in the art will recognize that changes and modifications may be made in these preferred embodiments without departing from the scope of the present invention. For example, those skilled in the art may adapt the actuator of the present invention to be actuated by applying air pressure or vacuum in accordance with the teaching of the present invention. In addition, the precise shape and orientation of the blocking member and actuator disclosed herein may be altered to meet specific application needs. These and other changes and modifications which are obvious to those skilled in the art are intended to be included within the scope of the present invention.

What is claimed is:

1. A transmission locking apparatus for use in connection with an automatic transmission included in a vehicle and coupled to an engine, said automatic transmission having a housing and a rotatable shifter shaft extending through said housing, said shifter shaft having an elongated protrusion on an end thereof for engagement with a shift linkage of said vehicle, and said shifter shaft selecting a forward gear when rotated in a first direction from a neutral position and a reverse gear when rotated in a second direction from said neutral position, said apparatus comprising:

a first plate having an elongated notch which mates with said elongated protrusion of said shifter shaft and having first and second holes located on opposing sides of said notch;

a second plate, extending substantially in an axial direction of said shifter shaft, said second plate having a hole formed therein, said second plate being rigidly attached to said first plate, and said second plate being curved to extend over an arc relative to an axis of said shaft;

a generally planar member having first and second fingers protruding in a first direction, said first and second fingers configured to mate with said first and second holes, and third and fourth fingers protruding in a second direction, said second direction generally opposing said first direction, and said third and fourth fingers being positioned on opposing sides of said notch for engagement with said shift linkage;

an actuator mountable to said housing and having a plunger, said actuator and said plates being mutually configured so that when said actuator and said plates are mounted to said housing and to said shifter shaft, respectively, said plunger extends toward said second plate, and when said shifter shaft is in said neutral position, said plunger extends through said second plate hole to prevent substantial rotation of said shifter shaft in either of said first and second directions.

2. A transmission locking apparatus as claimed in claim 1 wherein said plunger is spring biased to extend toward said second plate.

3. A transmission locking apparatus as claimed in claim 1 wherein:

said actuator exhibits an actuated state and a non-actuated state; and said actuator and said plates are further mutually configured so that during said actuated state said plunger is retracted from said second plate hole and said shifter shaft is not prevented from rotating.

4. A transmission locking apparatus as claimed in claim 3 additionally comprising means, coupled to said actuator, for sensing movement of said vehicle, said movement sensing means being cooperatively configured with said actuator to cause said actuator to exhibit said non-actuated state unless said vehicle is substantially stopped.

5. A transmission locking apparatus as claimed in claim 4, wherein:

said transmission resides within a vehicle having an engine operable at speeds inclusive of and in excess of an idling speed; and said apparatus additionally comprises means, coupled to said engine and to said actuator, for sensing engine speed, said speed sensing means being cooperatively configured with said actuator to cause said actuator to exhibit said non-actuated state when said speed of said engine substantially exceeds said idling speed.

6. A transmission locking apparatus as claimed in claim 1 wherein said actuator is mountable to said housing so that it remains stationary when said shifter shaft and said plates rotate.

7. A transmission locking apparatus for use in connection with a transmission included in a vehicle and coupled to an engine, said transmission having a housing and a rotatable shifter shaft extending through said housing, said shifter shaft having an elongated protrusion on an end thereof for engagement with a shift linkage of said vehicle, and said shifter shaft selecting a forward gear when rotated in a first direction from a neutral position and a reverse gear when rotated in a second direction from said neutral position, said apparatus comprising:

a first plate having an elongated notch which mates with said elongated protrusion of said shifter shaft and having first and second holes located on opposing sides of said notch;

a second plate, extending substantially in an axial direction of said shifter shaft, said second plate having a hole formed therein, said second plate being rigidly attached to said first plate, and said second plate being curved to extend over an arc relative to an axis of said shaft;

a generally planar member having first and second fingers protruding in a first direction, said first and second fingers configured to mate with said first and second holes, and third and fourth fingers protruding in a second direction, said second direction generally opposing said first direction, and said third and fourth fingers being positioned on opposing sides of said notch for engagement with said shift linkage;

an actuator mountable to said housing and having a plunger, said actuator and blocking member being mutually configured so that when said actuator and said blocking member are mounted to said housing nd to said shifter shaft, respectively, said plunger extends toward said blocking member, and when said shifter shaft is in said neutral position and said actuator is in a non-actuated state, said plunger extends through said blocking member hole to prevent substantial rotation of said shifter shaft in either of said first and second directions; and a controller coupled to said vehicle to sense vehicle movement, coupled to said engine to sense engine speed, and to said actuator to control actuation state of said plunger, said controller being configured to operate said actuator in said non-actuated state unless said vehicle is substantially stopped and said engine substantially exhibits said idling speed.

* * * * *

UNITED STATES PATENT AND TRADEMARK OFFICE
CERTIFICATE OF CORRECTION

PATENT NO. : 5,063,817

DATED : 12 November 1991

INVENTOR(S) : Donald L. Bogert

It is certified that error appears in the above-identified patent and that said Letters Patent is hereby corrected as shown below:

In Claim 7, Column 9, line 14 delete "nd" and insert --and--.

Signed and Sealed this

Twenty-third Day of February, 1993

*Attest:*

STEPHEN G. KUNIN

*Attesting Officer*     *Acting Commissioner of Patents and Trademarks*